United States Patent Office 2,765,261
Patented Oct. 2, 1956

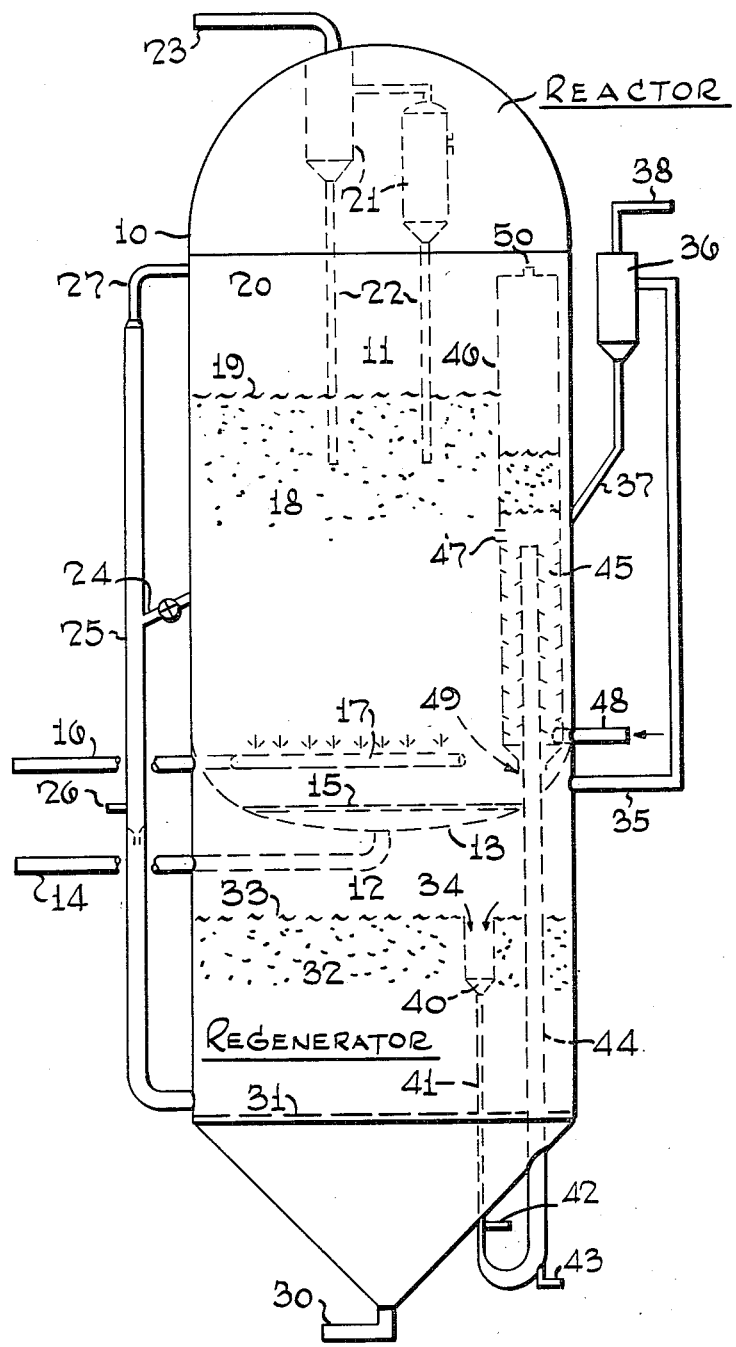

2,765,261

HYDROFORMING PROCESS AND APPARATUS

William P. Drews, Elizabeth, N. J., assignor to Esso Research and Engineering Company, a corporation of Delaware Application July 2, 1952, Serial No. 296,789

2 Claims. (Cl. 196—50)

This invention relates to the catalytic conversion of hydrocarbons and particularly to a process and apparatus whereby hydrocarbon fractions boiling within the motor fuel range of low knock rating may be converted into high octane number fuels rich in aromatics by the fluidized solids technique.

It is well known that petroleum naphthas can be subjected to reforming operations to yield liquid products boiling within the motor fuel or gasoline range and possessing improved octane numbers. Reforming operations employing solid catalysts, especially hydroforming and aromatization processes are widely used in the petroleum industry. By hydroforming is ordinarily meant a process wherein hydrocarbon fractions boiling within the motor fuel or naphtha range are treated at elevated temperatures and pressures in the presence of certain solid catalysts and hydrogen whereby the hydrocarbon fraction is increased in aromaticity with no net consumption of hydrogen. The term "aromatization" when used broadly refers to conversions which increase the aromaticity of the hydrocarbon fractions treated. As generally used in the petroleum industry, aromatization is a process in which hydrocarbon fractions are treated at elevated temperatures in the presence of solid catalysts and in the presence or absence of hydrogen, usually at pressures lower than those employed in hydroforming, for the purpose of increasing the aromaticity of the hydrocarbon fraction.

Catalytic reforming processes are usually carried out at temperatures of about 750–1150° F. in the pressure range of about 0–3000 lbs. per sq. inch and in the presence of such catalysts as molybdenum oxide, chromium oxide, nickel oxide or sulfide or any of a number of oxides or sulfides of metals of groups IV, V, VI, VII and VIII of the periodic system. These catalytic materials are usually dispersed or supported on a base or spacing agent. Commonly used spacing agents for this type of catalyst are alumina, either precipitated or of the gel type, activated alumina and zinc aluminate spinels.

It has been proposed in application Serial No. 188,236, filed October 3, 1950, now Patent No. 2,689,823, to effect the hydroforming of naphtha fractions in a fluidized solids reactor system in which naphtha vapors are passed through a dense, fluidized bed of hydroforming catalyst particles in a reaction zone, spent catalyst particles being withdrawn continuously from the dense bed and passed to a separate regeneration zone where inactivating carbonaceous deposits are removed, whereupon the regenerated catalyst particles are returned to the main reactor vessel. Fluid hydroforming as thus conducted has several fundamental advantages over fixed bed hydroforming such as (1) the operations are continuous, (2) the vessels and equipment can be designed for single rather than dual functions, (3) the reactor temperature is substantially constant throughout the reactor bed, and (4) the regeneration or reconditioning of the catalyst may be readily controlled.

A particular advantage of the foregoing fluid solids operation has been the fact that the freshly regenerated catalyst can be utilized to carry part of the necessary heat requirements for the hydroforming reaction from the regeneration zone into the reaction zone. It has been proposed, in this connection, to discharge hot, freshly regenerated catalyst particles from the regenerated catalyst standpipe into a stream of hot, hydrogen-rich recycle gas in a transfer line whereby the catalyst particles are subjected to a reconditioning treatment during their passage through the transfer line into the reaction zone involving at least a partial reduction of higher oxides of the catalyst metal formed during regeneration to a form of lower oxide of the catalytic metal which is more catalytically active. In view of the high temperature of the freshly regenerated catalyst (1050–1200° F.) and the exothermic character of the reaction between the hot, freshly regenerated catalyst and the hydrogen-rich gas, it is necessary to make the transfer line of small diameter and as short as possible in order to keep the time of contact of the regenerated catalyst and the hydrogen-containing gas sufficiently short to avoid overtreatment and/or thermal degradation of the catalyst.

Operations of this type have been limited to low catalyst to oil ratios (around 1:1) by selectivity considerations since higher ratios resulted in excessive carbon formation. However, low catalyst to oil ratios limit the transfer of heat from the regenerator to the reactor via the catalyst and make it necessary to provide cooling coils in the regenerator and to provide furnaces or other means for supplying heat to the reactor either directly or indirectly through the reactants and/or the hydrogen-rich recycle gas.

It is the object of this invention to provide a novel process and apparatus for hydroforming hydrocarbon fractions boiling within the motor fuel range in an advantageous manner by the fluidized solids technique.

It is also the object of this invention to provide a process and apparatus for hydroforming hydrocarbon fractions by the fluidized solids technique while minimizing the need for cooling coils in the regenerator as well as for feed stock and recycle gas preheat furnaces.

It is a further object of this invention to provide a process and apparatus for hydroforming hydrocarbon fractions by the fluidized solids technique which minimizes the danger of overtreatment or thermal degradation of the regenerated catalyst.

These and other objects will appear more clearly from the detailed specification and claims set out below.

In accordance with the present invention, the reducer for regenerated catalyst in a fluidized solids aromatizer or hydroformer is mounted within the reactor vessel and is so constructed and operated that reactor catalyst is intermixed with the freshly regenerated catalyst in order to absorb some of the sensible heat of the regenerated catalyst and also the heat of reduction of the regenerated catalyst. By arranging the reducer within the reactor vessel, it is possible to obtain a substantial saving in vessel cost and piping and to simplify heat transfer and operating control.

Reference is made to the accompanying drawing illustrating a vertical cross section through a reactor in accordance with the present invention.

In the drawing, 10 is a long, vertical shell enclosing an upper reactor zone 11 and a lower regenerator zone 12. A horizontal base or partition 13 separates the upper reactor zone from the lower regenerator zone. An inlet line 14 is connected to base member 13 for supplying hydrogen-rich or recycle gas to the bottom of the reactor zone. A perforated plate or grid 15 is preferably arranged across the bottom of the reactor zone 11 in order to distribute the incoming hydrogen-rich gas evenly over the entire cross section of the reactor zone. An inlet line 16 for supplying hydrocarbon or naphtha feed is connected to the reactor and preferably terminates in a distributor ring 17 or the like within the reactor. If desired, the naphtha feed can be combined with the recycle gas and introduced beneath distributor grid 15 or the grid 15 can be eliminated and the recycle gas and naphtha feed may be introduced through a single ring or separate distributor rings.

Catalyst is supplied to the reactor zone in finely divided condition and is maintained as a dense, fluidized, liquid-simulating bed 18, having a definite level 19 by control of the velocity of the gaseous reactant fluids passing upwardly through the vessel. The vaporous reaction products leaving the dense bed 18 entrain a small amount of catalyst particles forming a dilute phase or suspension designated at 20 in the upper portion of the reactor. The reaction products and entrained catalyst particles are passed through separating means 21 arranged in the upper part of the reactor. This separating means, which may be a cyclone separator or the like, separates the entrained catalyst particles from the vaporous reaction products. The solid catalyst particles separated in cyclones 21 are returned to the dense bed 18 through dip-legs or pipes 22 which extend below the upper level 19 of the dense bed 18. Valve or damper means and fluidizing gas inlet lines may be provided in the dip pipes 22 to control the return of catalyst particles to the dense bed. The vaporous reaction products leaving the separating means 21 pass overhead through outlet line 23 to suitable product recovery and processing equipment.

Catalyst particles flow from the dense bed 18 through valve controlled connector pipe 24 into standpipe stripper 25. Stripping gas such as steam or the like is introduced into the standpipe stripper 25 as through inlet line 26. The stripping gas passes countercurrent to the descending catalyst particles and strips off entrained or adsorbed hydrogen and light hydrocarbons which pass overhead through connector line 27 into the dilute phase 20 in the upper part of the reactor.

The stripped, spent catalyst particles are discharged from the bottom of standpipe 25 through flow restriction 28 into standpipe 29 and thence into the regenerator zone 12. Regeneration gas or air is supplied to the regenerator zone 12 through inlet line 30. A perforated plate or grid 31 is preferably provided in the lower part of the regenerator zone 12 to insure uniform distribution of the regeneration gas over the entire cross section of the regenerator zone 12. The velocity of the regeneration gas through the regenerator zone is so controlled as to form a dense, fluidized bed 32 having a definite level 33. The regeneration gases leaving the dense bed 32 entrain small amounts of catalyst particles forming a dilute or disperse phase 34 in the upper part of the regenerator zone. The regeneration gases are taken through outlet line 35 to a cyclone separator 36 or the like wherein the major part of the entrained catalyst particles are separated from the gases, the recovered catalyst particles passing through dip pipe 37 back to the reaction zone, pretreat zone or regeneration zone, depending on pressures and process considerations as will be described in greater detail below.

The regeneration or flue gases pass overhead from separator 36 through outlet line 38 and suitable pressure control means to a waste gas stack or to suitable scrubbing and storage equipment in the event that it is desired to utilize these gases for stripping or fluidization purposes.

Regenerated catalyst overflows from dense bed 32 into well 40 which is connected at its bottom to the downflow leg 41 of a U-bend transfer line. Inert stripping gas such as nitrogen or the like is supplied at 42 in order to strip off carbon oxides and any residual oxygen from the regenerated catalyst. A lift gas which may be an inert gas such as methane or a reducing gas such as hydrogen or recycle gas is supplied at 43 at the bottom of the upflow leg 44 of the U-bend transfer line in order to convey the regenerated catalyst particles rapidly through upflow leg 44 to the pretreater chamber 45.

The pretreater chamber 45 comprises a cylindrical shell member 46 that extends from the distributor grid 15 near the bottom of the reactor zone to a point well above the maximum dense bed level 19. The shell member 46 should be so arranged with respect to the interior of the reactor zone as to permit uniform contact of the dense bed 18 with the exterior surface of the shell member to facilitate transfer of at least part of the heat of reduction released in pretreater 45 through the walls of the pretreater into the dense bed 18. One or more orifices 47 are provided in the wall member 46 to permit flow of reactor catalyst into the pretreater chamber for admixture with the freshly regenerated catalyst discharged from the upper end of upflow leg or conduit 44 in order to control the temperature of the catalyst in the pretreater. Hydrogen-rich gas or recycle process gas is supplied to the pretreater 45 at 48 and passes upwardly through the pretreater 45 countercurrent to the descending mixture of reactor and regenerated catalyst. Baffles may be provided in the pretreater 45 as shown in order to improve the contact of the hydrogen-rich pretreating gas and the catalyst particles. An orifice 49 is provided at the bottom of the pretreater chamber for controlling the discharge of pretreated catalyst into the dense reactor bed 18. The pretreating gases pass overhead from the pretreater zone and are discharged through outlet 50 into the dilute or disperse phase 20 in the upper part of the reactor zone.

In the hydroformer or aromatizer as shown, the greater portion of the sensible heat of the regenerated catalyst as well as the heat of reduction of the regenerated catalyst is effectively transferred into the main reactor bed either by heat transfer through the walls of the reducer or pretreater or by means of circulation of a stream of reactor catalyst through the reducer or pretreater.

The reducer or pretreater is run at a density somewhat higher than that of the reactor bed, and the resulting fluistatic pressure differential between the two beds forces a stream of catalyst through the orifice 47 into the reducer or pretreater where it is intermixed with freshly regenerated catalyst discharged from the upper end of conduit 44. This mixture flows downward through the reducer pretreater countercurrent to pretreating gas supplied through inlet 48 and re-enters the reactor bed through the orifices at the bottom of the reducer or pretreater. A part of the heat is also transferred directly to the reactor bed through the reducer or pretreater walls. Interbed catalyst circulation is set by sizing the orifices and adjusting the reducer bed density by gas rate, and reducer temperature is self-controlling, being a function of the temperature differential between the reducer bed and the reactor bed.

The advantages of this system over an arrangement with the reducer mounted externally of the reactor are as follows:

1. The reducer is of less expensive construction, due to the elimination of lining and pressure construction.
2. Piping is considerably simplified and several slide valves and expansion joints are eliminated.
3. The pretreater or reducer is somewhat smaller for a given hold-up due to reduced reactor-reducer catalyst circulation (since part of the heat is transferred through the reducer walls).
4. It is practically impossible for the reducer to overheat drastically.
5. Control is simplified because of the free-running catalyst circuit and the self-controlling features.

The feed or charging stock to the reforming reactor may be a virgin naphtha, a cracked naphtha, a Fischer-Tropsch naphtha or the like having a boiling range of from about 130°–430° F. or a narrow boiling fraction within this range, for example, a fraction having a boiling range of from 130–185° F. The feed stock is preheated alone or in admixture with hydrogen-rich recycle gas to reaction temperature or to the maximum temperature possible while avoiding thermal degradation of the feed stock. Ordinarily, preheating of the feed stock is carried out to temperatures of about 800–1050° F., preferably about 1000° F. The naphtha preheat can be carried out to high temperatures while avoiding thermal degradation thereof by limiting time of residence of the feed stock in the preheat furnace and in the transfer and feed inlet lines. The hydrogen-rich or recycle process gas, which contains from about 50–80 vol. per cent or more of hydrogen, is preheated to temperatures of about 1150–1300° F., preferably about 1200° F. prior to the introduction thereof into the inlet line. The recycle gas should be circulated through the reactor zone at a rate of from about 1000–8000 cu. ft. per barrel of feed. The amount of recycle gas used is preferably the minimum amount that will suffice to introduce the necessary heat of reaction and keep carbon formation at a low level.

The reactor system is charged with a mass of finely divided reforming catalyst. Suitable catalysts include group VI metal oxides, such as molybdenum oxide, chromium oxide or tungsten oxide or mixtures thereof upon a carrier such as activated alumina, zinc aluminate spinel or the like. Preferred catalysts contain about 5 to 15 wt. percent molybdenum oxide or from about 10 to 40 wt. percent chromium oxide upon a suitable carrier. If desired, minor amounts of stabilizers and promoters such as silica, calcium oxide, ceria or potassia can be included in the catalyst. The catalyst particles are, for the most part, between 200 and 400 mesh in size or about 0–200 microns in diameter with a major proportion between 20 and 80 microns.

The reforming reactor vessel should be operated at temperatures between 800° F. and 1150° F. and at pressures between about 5 and about 500 lbs. per sq. inch. The particular temperature and pressure used is governed principally by the nature of the feed stock and the nature of the end product desired. For example, a narrow boiling hexane-rich fraction is preferably reformed in contact with a chromia-alumina catalyst at temperatures of about 1000–1025° F. and at pressures of about 10–50 lbs. per sq. inch gauge while a 200–350° F. boiling range naphtha is preferably reformed in contact with a molybdenum oxide-alumina catalyst at temperatures of about 900–925° F. and at pressures of about 200 lbs. per sq. inch gauge. Lowering reactor pressure ordinarily results in increased carbon formation while increasing reactor pressure results in an increase in catalyst selectivity to light products of ($C_4$'s and lighter). The regenerator zone is normally operated at temperatures of about 1050–1200° F. and at essentially the same pressure as the reactor zone to facilitate flow between the several vessels. The residence time of the catalyst in the reactor is of the order of from about 0.5 to 5 hours and in the regenerator of from about 3 to 15 minutes. Regeneration is ordinarily conducted with an excess of air or with such amounts of air that there will be some free oxygen in the flue gases from the regenerator and the catalytic metal will be converted to a higher oxide during regeneration.

The weight ratio of catalyst to oil introduced into the reactor should be about 0.3/1 to 3.0/1. Space velocity or the weight in pounds of feed charged per pound of catalyst in the reactor depends upon the age or activity level of the catalyst, the character of the feed stock and the desired octane number of the product. Space velocity for molybdenum oxide on alumina gel or a chromia-alumina catalyst may vary, for example, from about 1.5 wt./hr./wt. to about 0.15 wt./hr./wt. The temperature in the regenerator is maintained between about 1050 and 1200° F., preferably at the maximum temperature that the catalyst can withstand in order that a maximum amount of heat can be transferred to the reaction zone as sensible heat of the regenerated catalyst. The reduction of the higher catalytic metal oxides formed in the regenerator is highly exothermic and results in a substantial temperature rise which may be of the order of about 120° F. The temperature rise is dependent upon the nature of the catalyst, i. e. whether a chromia- or molybdena-containing catalyst, as well as upon the amount of catalytic metal oxide present in the catalyst. In the event that hydrogen-containing gas is supplied through line 43 to lift the regenerated catalyst through upflow leg 44, it should be supplied at such a rate as to convey the regenerated catalyst as rapidly as possible into the pretreater reducer, preferably in a matter of about 2 to 5 seconds. It is also necessary to supply reactor catalyst to the pretreater reducer 45 at a sufficient rate to absorb this heat of reaction. The ratio of reactor catalyst to regenerator catalyst added to the pretreater-reducer will vary somewhat depending upon the temperature at which the reactor zone is operated or upon the spread or difference between the temperature maintained in the regenerator zone and the reactor zone. The amount of reactor catalyst supplied to the pretreater-reducer should be sufficient to prevent a temperature rise of more than a few degrees, preferably not more than 10° F. above the regenerator temperature. The residence time of the catalyst in the pretreatment or reducing zone may be from about 0.5 to 180 minutes.

The foregoing description contains a limited number of embodiments of the present invention. It will be understood, however, that numerous variations or modifications may be made by those skilled in this art without departing from the scope of this invention.

What is claimed is:

1. In a process for reforming hydrocarbons in contact with finely divided reforming catalysts in accordance with the fluidized solids technique, the improvement which comprises continuously withdrawing a stream of catalyst particles from a dense fluidized bed of catalyst particles within the reactor zone, regenerating the withdrawn catalyst particles by burning carbonaceous deposits therefrom at elevated temperatures in a separate regenerator zone, withdrawing a stream of regenerated catalyst particles from the regenerator zone and discharging the withdrawn regenerated catalyst particles into a separate pretreater zone, arranged within and in heat exchange relation to the dense fluidized bed of catalyst particles within the reactor zone, supplying hydrogen containing gas to the pretreater zone in order to reduce higher catalytic metal oxides formed in the regeneration to a lower, more catalytically active form of catalytic metal oxide, discharging catalyst from the dense fluidized bed in the reactor zone into the pretreater zone in sufficient amount to absorb a substantial amount of the sensible heat as well as the heat of reduction of the regenerated catalyst and prevent the temperature of the catalyst in the pretreater from exceeding the temperature of the catalyst in the regenerator passing the mixture of reactor and regenerated catalyst downwardly through the pretreater-reduction zone countercurrent to the stream of hydrogen containing gas and discharging said mixture from the bottom of said pretreating zone into the dense, fluidized bed of catalyst particles within the reactor zone.

2. A reactor comprising in combination a main reactor vessel, an auxiliary pretreating vessel arranged within and extending substantially the entire vertical height of the main reactor vessel, a conduit for discharging freshly regenerated catalyst near the midpoint of the pretreating vessel, an orifice in the wall of the pretreating vessel near the outlet end of said conduit, an inlet for supplying hydrogen-containing pretreating gas into the lower part of the pretreating vessel, an outlet at the top of the pretreating vessel for discharging pretreating gases into the upper part of the reactor vessel and an outlet in the bottom of said pretreating vessel for discharging solid catalyst particles into the lower part of the reactor vessel.

(References on following page)

References Cited in the file of this patent

UNITED STATES PATENTS

| | | |
|---|---|---|
| 2,366,372 | Voorhees | Jan. 2, 1945 |
| 2,421,677 | Belchetz | June 3, 1947 |
| 2,451,619 | Hengstebeck | Oct. 19, 1948 |
| 2,459,824 | Leffer | Jan. 25, 1949 |
| 2,472,844 | Munday | Jan. 14, 1949 |
| 2,541,186 | Anderson | Feb. 13, 1951 |
| 2,558,194 | Orescan | June 29, 1951 |
| 2,618,535 | Trainer et al. | Nov. 18, 1952 |
| 2,631,927 | Trainer et al. | Mar. 18, 1953 |
| 2,655,464 | Brown et al. | Oct. 13, 1953 |
| 2,700,639 | Weikart | Jan. 25, 1953 |